US011977477B2

United States Patent
Thakur et al.

(10) Patent No.: US 11,977,477 B2
(45) Date of Patent: May 7, 2024

(54) SYSTEM AND METHOD FOR IDENTIFICATION OF WEB ELEMENTS USED IN AUTOMATION TEST CASE

(71) Applicant: QUALITIA SOFTWARE PVT. LTD., Pune (IN)

(72) Inventors: Sattam Thakur, Gurugram (IN); Rahul Chaudhari, Pune (IN); Ravi Nukala, Bangalore (IN)

(73) Assignee: QUALITIA SOFTWARE PVT. LTD., Pune (IN)

( * ) Notice: Subject to any disclaimer, the term of this patent is extended or adjusted under 35 U.S.C. 154(b) by 89 days.

(21) Appl. No.: 17/769,833

(22) PCT Filed: Sep. 23, 2020

(86) PCT No.: PCT/IN2020/050810
§ 371 (c)(1),
(2) Date: Apr. 18, 2022

(87) PCT Pub. No.: WO2021/074922
PCT Pub. Date: Apr. 22, 2021

(65) Prior Publication Data
US 2022/0365871 A1    Nov. 17, 2022

(30) Foreign Application Priority Data
Oct. 18, 2019 (IN) .............. 201921042291

(51) Int. Cl.
*G06F 11/36* (2006.01)
*G06F 16/951* (2019.01)

(52) U.S. Cl.
CPC ...... *G06F 11/3684* (2013.01); *G06F 11/3688* (2013.01); *G06F 16/951* (2019.01)

(58) Field of Classification Search
CPC . G06F 11/3684; G06F 11/3688; G06F 16/951
See application file for complete search history.

(56) References Cited

U.S. PATENT DOCUMENTS 9,038,026 B2 * 5/2015 Chandra ............. G06F 11/3684
717/124
9,424,167 B2 8/2016 Lee et al.
(Continued)

FOREIGN PATENT DOCUMENTS

WO    2012063070 A1    5/2012

OTHER PUBLICATIONS

International Search Report and Written Opinion for related International Application No. PCT/IN2020/050810 mailed Jan. 6, 2021.

*Primary Examiner* — S. Sough
*Assistant Examiner* — Zheng Wei
(74) *Attorney, Agent, or Firm* — Renner, Otto, Boisselle & Sklar, LLP

(57) ABSTRACT

Disclosed are a system (100) and a method for an identification of web elements used in an automation test case. The system (100) and the method ensure reliable identification of an object despite dynamism. The system (100) and the method allow a tester to focus on the test case development of test cases rather than object management that in turn increases the success rate and efficiency of the automatic testing. The system (100) and the method track changes in object attributes, structure and behaviour thereby facilitating identification of dynamic objects automatically and correction of the object locator on the fly during test execution.

8 Claims, 5 Drawing Sheets

(56) References Cited

U.S. PATENT DOCUMENTS

| | | | |
|---|---|---|---|
| 10,296,563 B2* | 5/2019 | Shaath | G06F 40/14 |
| 10,552,299 B1* | 2/2020 | Surace | G06F 11/3684 |
| 2008/0148235 A1* | 6/2008 | Foresti | G06F 11/3604 |
| | | | 717/125 |
| 2010/0175055 A1* | 7/2010 | Wang | G06F 8/42 |
| | | | 717/137 |
| 2015/0339213 A1* | 11/2015 | Lee | G06F 3/0484 |
| | | | 717/125 |
| 2017/0324803 A1 | 11/2017 | Shaath | |
| 2018/0307590 A1* | 10/2018 | Padhi | G06V 30/416 |
| 2020/0073686 A1* | 3/2020 | Hanke | G06F 18/22 |
| 2020/0249964 A1* | 8/2020 | Fernandes | G06F 9/451 |

* cited by examiner

SYSTEM AND METHOD FOR IDENTIFICATION OF WEB ELEMENTS USED IN AUTOMATION TEST CASE

This application is a national phase of International Application No. PCT/IN2020/050810 filed 23 Sep. 2020, which claims priority to India Application No. 201921042291 filed 18 Oct. 2019, the entire disclosures of which are hereby incorporated by reference.

FIELD OF THE INVENTION

The present invention generally relates to automated testing solutions and more particularly, to a system and a method for an identification of web elements used in an automation test case.

BACKGROUND OF THE INVENTION

While writing automation test cases the tester needs to update an object every time the page changes as the older locator for the existing object no longer works. This becomes a tedious task as webpages have become more dynamic in nature and has changing attributes every time they are loaded or built. Most of the times, these changes are not known to the tester. This is a major problem for the tester as they will have to update their test cases for every automation run and waste their time in just maintenance of test cases. The drawback in currently available automation engines is that they are dependent on XPath and CSS Selector which are string-based locators and figuring out a working locator is heavily dependent on the skill of the one identifying the locator and to make sure it can work for the dependent applications in future runs.

One of the crucial aspects of a graphical user interface (GUI) based automation is reliable identification of user interface (UI) controls. In web based GUI, many technologies are used, each having different way of rendering the UI Controls (hereinafter "objects"). All technologies eventually represent the objects in HTML and Web Browsers render them accordingly. One needs to rely on various attributes to locate a particular object on the screen. The conventional way of identifying the object is through a fixed locator that makes use of HTML structure to define a path. The locator is defined once and used multiple times. While forming the path of the object, various object attributes are used. However, due to dynamic nature of the attributes, the path doesn't reliably locate the object.

Modern-day web-applications usually have dynamic web elements/objects and consistency in the execution of test cases with these dynamic objects is the biggest challenge that modern day web applications face.

Accordingly, there exists a need to provide a system and a method for an identification of web elements used in an automation test case that overcomes the above mentioned drawbacks of the prior art.

OBJECTS OF THE INVENTION

An object of the present invention is to ensure reliable identification of an object despite dynamism.

Another object of the present invention is to allow a tester to focus on a test case development of test cases rather than object management that in turn increases the success rate and efficiency of an automatic testing.

SUMMARY OF THE INVENTION

Accordingly, the present invention provides a system for an identification of web elements used in an automation test case. The system is implemented on an electronic device of a user. The system comprises an object identifier module, an automation engine, an object repository and a reporting module.

The object identifier module is adapted to identify web elements/objects of the automation test case. The object identifier module includes a locator generator, an object structure generator, an object spy and a data serializer embedded therein. The locator generator generates a string-based locator. The string-based locator is selected from any one of XML Path Language (XPath) and Cascaded Style Sheet (CSS) Selector. The object structure generator generates a hierarchal representation of ancestors of the object. The object spy includes an object repository handler and an execution environment handler embedded therein. The object repository handler is used to retrieve an object data from the object repository. The execution environment handler is an interface to interact with an execution environment. The data serializer converts the object into a stream of bytes.

The automation engine is operably connected to the object identifier module and adapted to use the string-based locator to identify the element on a current page. The automation engine includes an object locator tester, an object repository handler, an execution environment handler and a correction module. The object locator tester is adapted for validating search results using a locator value. The execution environment handler is an interface to interact with the execution environment. The object repository handler is adapted to retrieve the object data from the object repository. The object data is a data required to identify the element in a current view of the execution environment. The correction module processes the object data. The correction module corrects the object automatically on fly during test execution. The correction module includes an object finder, an object data comparator and a data remodeler. The object finder is adapted to find a list of matching objects in a document using the locator value. The object data comparator is adapted to compare attributes of the elements with a saved object data. The data remodeler updates the object data after receiving comparison from the object data comparator.

The object repository is operably connected to the automation engine for storing data of object locators and for maintaining the object data. The reporting module is operably connected to the correction module and adapted to display results of the text execution.

In another aspect, the present invention provides a method for an identification of web elements used in an automation test case.

BRIEF DESCRIPTION OF THE DRAWINGS

The objects and advantages of the present invention will become apparent when the disclosure is read in conjunction with the following figures, wherein.

DETAILED DESCRIPTION OF THE INVENTION

The foregoing objects of the invention are accomplished and the problems and shortcomings associated with prior art techniques and approaches are overcome by the present invention described in the present embodiments.

The present invention provides a system and a method for an identification of web elements used in an automation test case. The system and method allow an accurate identification of the web element/object even after unique identification details thereof in the page is changed. The system and the method allow a tester to focus on the test case development of test cases rather than object management that in turn increases the success rate and efficiency of the automatic testing.

The present invention is illustrated with reference to the accompanying drawings, throughout which reference numbers indicate corresponding parts in the various figures. These reference numbers are shown in bracket in the following description.

Figure 1:
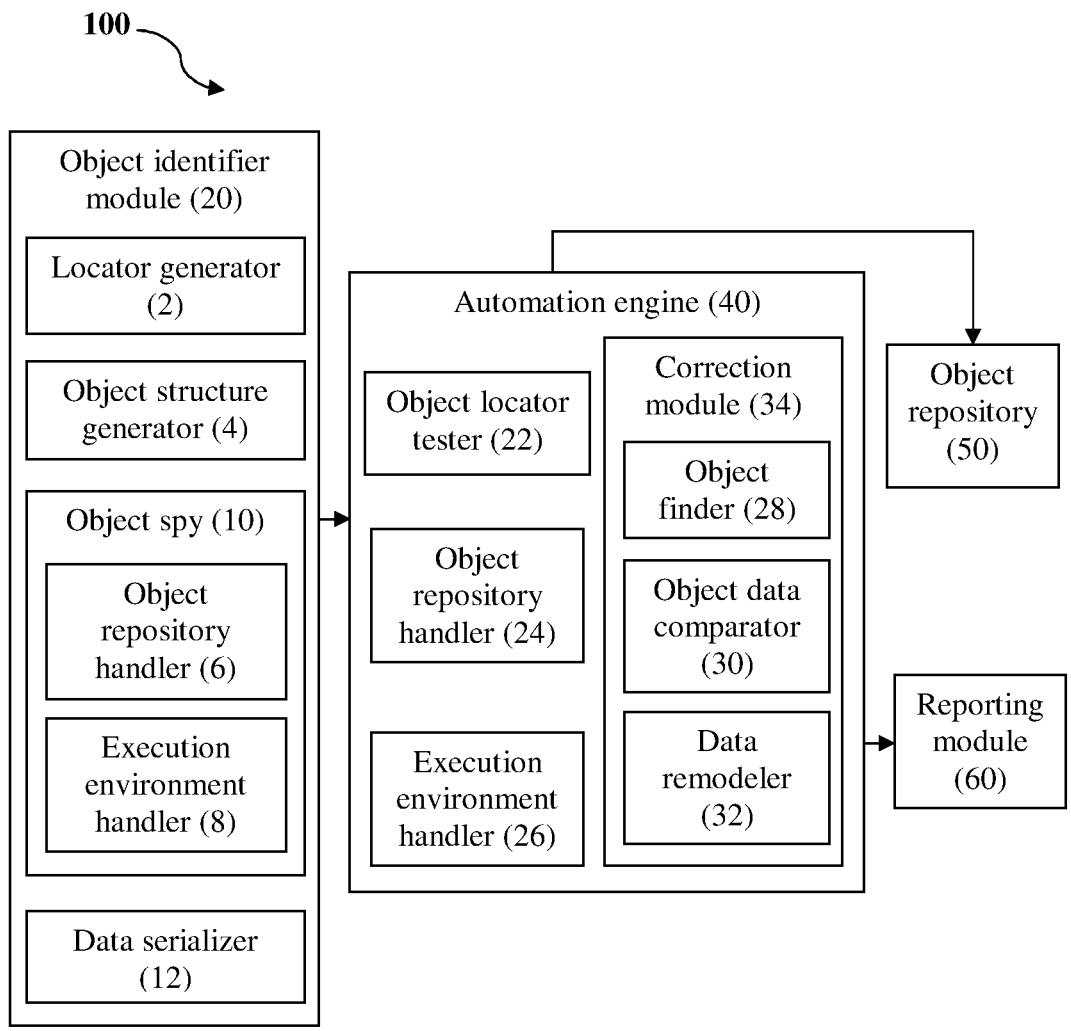
FIG. 1 shows a block diagram of a system for an identification of web elements used in an automation test case, in accordance with the present invention.

Referring to FIG. 1, a system (100) for an identification of web elements used in an automation test case in accordance with the present invention is shown. The system (100) is implemented on an electronic device (not shown) of a user. The electronic device includes any one of desktop computer, laptop and other devices known in the art. In the context of the present invention, the electronic device includes an input device, an output device, a memory, a processor and a communication module.

As shown in FIG. 1, the system (100) comprises an object identifier module (20), an automation engine (40), an object repository (50) and a reporting module (60).

The object identifier module (20) is adapted to identify web elements/object of the automation test case. The object identifier module (20) includes a locator generator (2), an object structure generator (4), an object spy (10) and a data serializer (12) embedded therein.

The locator generator (2) generates a string-based locator. In an embodiment, the string-based locator is selected from any one of XML Path Language (XPath) and Cascaded Style Sheet (CSS) Selector. The object structure generator (4) generates a hierarchal structure/representation of the ancestors of the object. In the context of the present invention, an element is an object available in an execution environment and DOM element is Hyper Text Markup Language (HTML) element that is learned and stored as an object.

The object spy (10) includes an object repository handler (6) and an execution environment handler (8) embedded therein. The object repository handler (6) is used to retrieve an object data from the object repository (50). The execution environment handler (8) is an interface to interact with the execution environment.

The data serializer (12) is adapted for converting the object into a stream of bytes. The converted stream of bytes of the object is then stored or transmitted to any one of a memory, a database and a file. Specifically, the serialized data is stored in the object repository (50) by the object spy (10).

The automation engine (40) is operably connected to the object identifier module (20). The automation engine (40) is adapted to execute test steps in the execution environment. In the context of the present invention, the test step is a data required for the automation engine (40) to perform an action. The automation engine (40) includes an object locator tester (22), an object repository handler (24), an execution environment handler (26) and a correction module (34) embedded therein.

The object locator tester (22) uses a locator value to validate the search results. The object repository handler (24) is used to retrieve the object data from the object repository (50). In the context of the present invention, the object data is a data required to identify the element in the current view of the execution environment. The execution environment handler (26) is an interface to interact with the execution environment.

The automation engine (40) requests the object from the correction module (34) using the object data. The correction module (34) asks for a handle to the current context using the execution environment handler (26). The correction module (34) is embedded in the automation engine (40) for processing the object data. The correction module (34) processes the data and returns a status and the object to the automation engine (40).

Specifically, the correction module (34) is configured to correct the object automatically on the fly during test execution. The automation engine (40) allows interacting with a current document by using JavaScript during the automation execution. Specifically, the automation engine (40) uses the string-based locator to identify an element on the current page. In an embodiment, the string-based locator is selected from any one of XML Path Language (XPath) and Cascaded Style Sheet (CSS) Selector.

The correction module (34) includes an object finder (28), an object data comparator (30) and a data remodeler (32) embedded therein.

The object finder (28) uses the locator value to find a list of matching objects in a document. The list of matching objects is then checked to determine whether the required object is found. If multiple or no results are found, the object data is tested against the available elements in the document by the object finder (28) to find a single element with a highest threshold match.

The object data comparator (30) is adapted to compare attributes of the elements with a saved object data. The element found after comparison is sent to the data remodeler (32) by the object data comparator (30) to update the object data.

In accordance with the present invention, the system (100) applies two phases namely a learning phase and an identification phase for the identification of web elements. The system (100) provides a way to accurately identify the object by learning required data thereof once and generating a new locator with new data that helps to identify the actual element in the current page if present and sends the new locator along with the data to the automation engine (40) every time the automation engine (40) is not able to find the element using the locator thereof. The data generated while identifying the element for the first time forms a basis for subsequent identifications.

The object repository (50) is operably connected to the automation engine (40). The object repository (50) stores data of the object locators and maintains the object data.

The reporting module (60) is operably connected to the correction module (34). The reporting module (60) is used to display results of the text execution. Specifically, the result shows whether the test is executed successfully and whether the object is corrected. The result of the execution is shown in the form of a message to the tester. So every object search/match results of the object found or not found is reported to the tester/user on the object basis.

In another aspect, the present invention provides a method for an identification of web elements used in an automation test case. Specifically, the method is described herein below in conjunction with the system (100) of FIG. 1.

The method for identification of web elements involves two steps namely a learning phase (210) and an identification phase (250).

Figure 2:
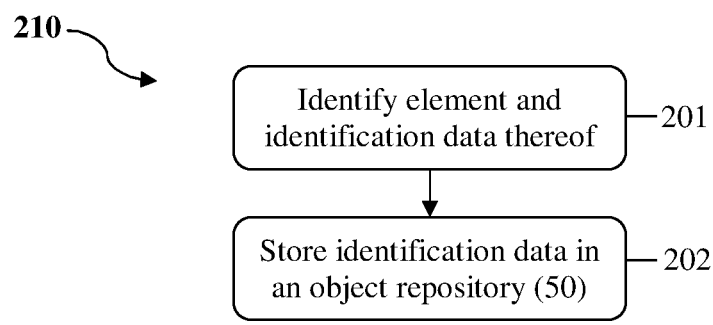
FIG. 2 shows a flowchart of a learning phase of a method for an identification of web elements used in an automation test case, in accordance with the present invention.

FIG. 2 shows the detailed flow chart to illustrate the learning phase (210) from steps (201) to (202). At step (201), the tester identifies the element and identification data thereof. This is facilitated by the object spy (6).

The data is the decision maker during the identification phase (250) and the system (100) is not able to accurately identify the object if this is not available. In an embodiment, the identification data consists of the point in time hierarchical representation of the object and all ancestors thereof along with the tag, attributes and relative indexes of each of the object and ancestors thereof. The identification data is stored in a JSON representation along with XPath and/or CSS locator in the object repository (50) at step (202).

Figure 3A:
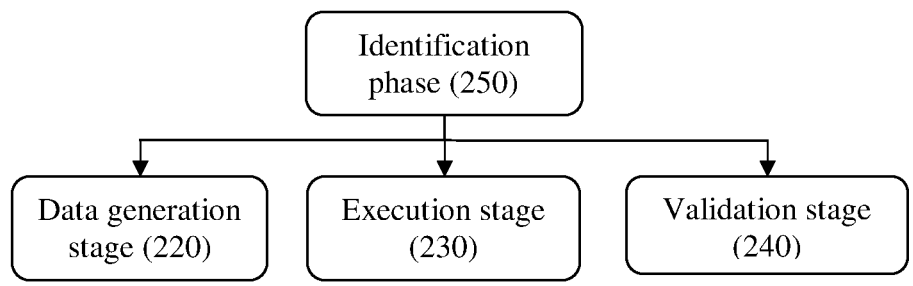
FIG. 3a shows a flow diagram of an identification phase of the method for the identification of web elements used in the automation test case, in accordance with the present invention.

As shown in FIG. 3a, the identification phase (250) includes a data generation stage (220), an execution stage (230) and a validation stage (240).

Figure 3B:
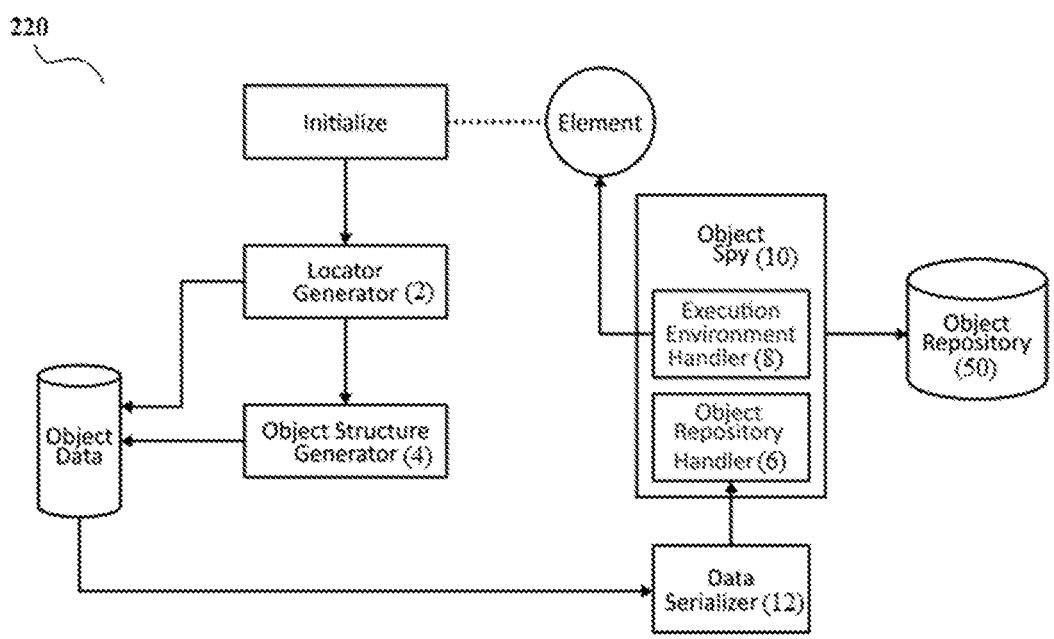
FIG. 3b shows a flow diagram of a data generation stage for identification of an object, in accordance with the present invention.

FIG. 3b shows the detailed flow diagram to illustrate the data generation stage (220) for the identification of the object during the identification phase (250). In a first step of the data generation stage (220), an element from the execution environment handler (8) is received. The element is then used by the locator generator (2) to generate a unique locator to identify the element in the page and saved in a memory as a string. Specifically, the string-based locator is generated by the locator generator (2). In an embodiment, the string-based locator is selected from any one of XPath and CSS Selector.

The hierarchical representation of the ancestors of the object is generated by the object structure generator (4). The generated string-based locator and the generated hierarchical representation are merged into a single object. Thereafter, the object data is serialized by the data serializer (12). The serialized data is utilized by the automation engine (40) to perform the test. Specifically, in the serialization the object data is pre-processed and converted so as to be consumable by the automation engine (40). This step is essential as the format in which the object data is stored, cannot be consumed directly by the automation engine (40). Hence pre-processing and conversion is inevitable. The serialized data is then stored by the object repository handler (6) in the object repository (50).

Figure 3C:
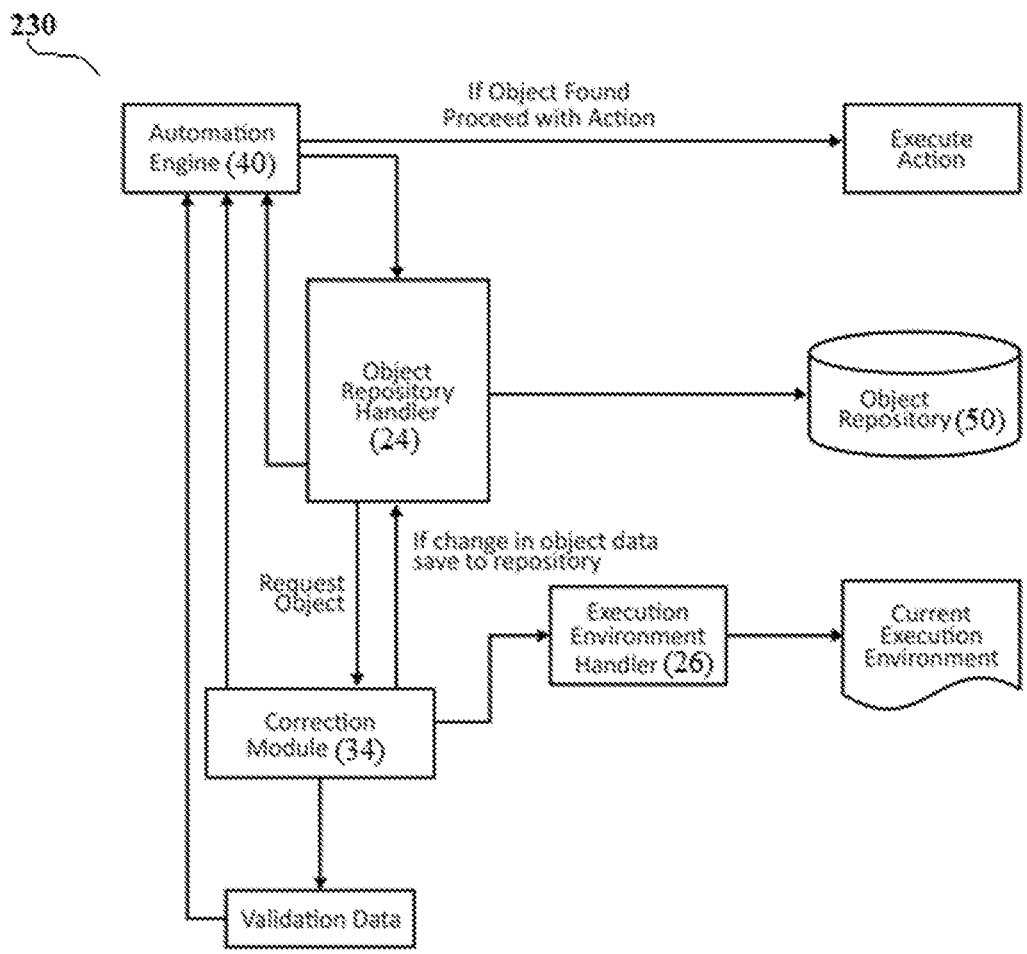
FIG. 3c shows a flow diagram of an execution stage of the method for the identification of web elements used in the automation test case, in accordance with the present invention.

Once the data is generated, the execution stage (230) starts. FIG. 3c shows a detailed flow diagram of the execution stage (230). In a first step of execution, the automation engine (40) processes the test step. In the context of the present invention, the test step is a data required for the automation engine (40) to perform an action. The automation engine (40) then requests the object using the object repository handler (24). In response to the request of the automation engine (40), the object repository handler (24) retrieves the object data from the object repository (50).

The automation engine (40) then requests the object from the correction module (34) using the object data. The correction module (34) asks for a handle to the current context using the execution environment handler (26). The correction module (34) processes the data and returns a status and the object to the automation engine (40). Thereafter, the automation engine (40) performs the action on the object retrieved.

Figure 3D:
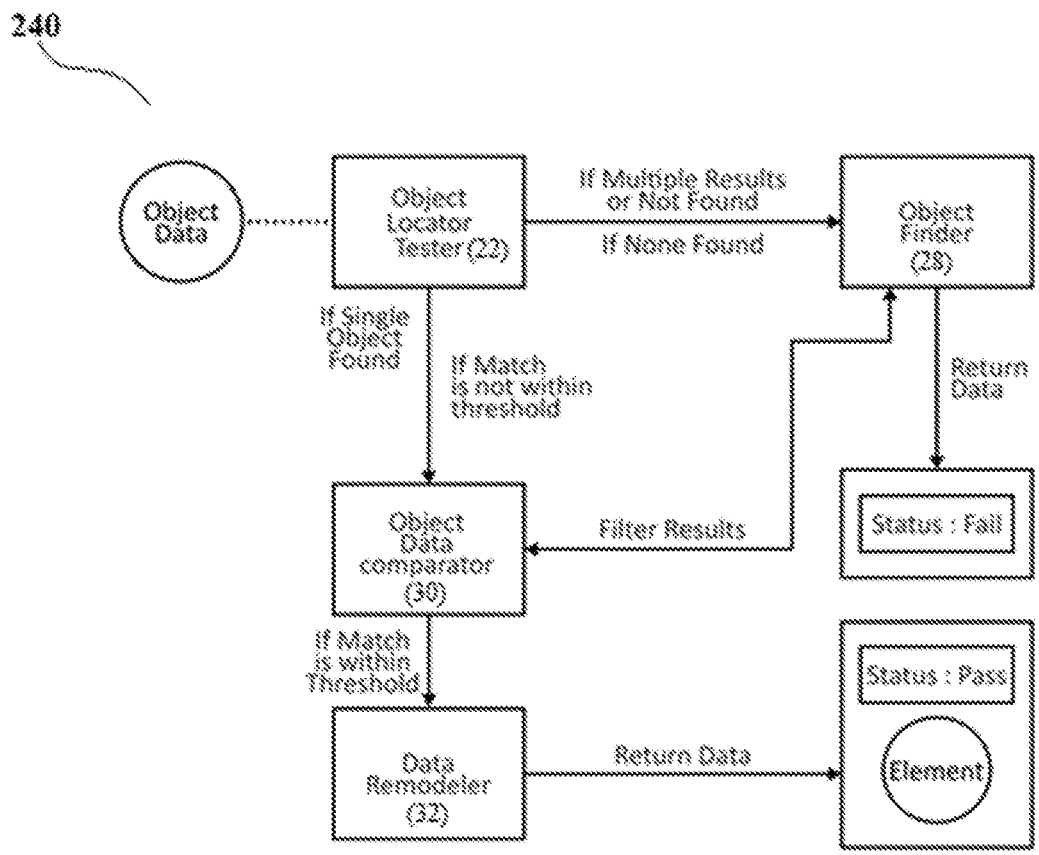
FIG. 3d shows a flow diagram of a validation stage in an automation process, in accordance with the present invention.

After the execution step (230), the validation stage (240) starts wherein validation of the object is carried out. FIG. 3d shows a detailed flowchart of the validation stage (240). In a first step of the validation stage (240), the object locator tester (22) uses the locator value to find a list of matching objects in the document. If a single result is found, the element's attributes are compared with the saved object data in the object data comparator (30). If multiple or no results are found, the object data is tested against the available elements in the document by the object finder (28) to find a single element with a highest threshold match. If there are no matches within the threshold, the correction module (34) returns a validation result with no object found and with status as fail. The element found is sent to the data remodeler (32) to update the object data. The correction module (34) returns the validation result containing the reference of the element and status as pass.

In another embodiment, the validations are done using pattern matching for generating reliable locators and the object data is used as an input for an artificial intelligence (AI) based validation which feeds back to a dynamic rules engine which optimizes the data gathering next time the object is learned.

The stored locator is used to identify the element first. If the element is found with minimal changes to structure thereof, the method moves to a remodeling phase or else the method moves to a verification stage.

In the verification stage, once invoked the object data comparator (30) traverses and matches the actual document with the identification data to establish a common point there between. If a common match is found, the object finder (28) uses pattern matching to sequentially identify objects in the hierarchy with the identification data until the required element is found. If the element is not found, the correction module (34) exits with the message that the identification data has to be relearned for the current object as the stored data does not match with the data in the document.

In the remodeling phase, when the element has been found the data remodeler (32) generates new identification data for the object. This data is generated by appending any new information with the already stored data and updating the hierarchy if there is change. Using this newly learned data a new more resilient locator is generated by the data remodeler (32) along with the locator which can be used in the next validation stage (240).

In accordance with the present invention, various attributes are stored at the time of capturing the object. During the next rendering of a user interface, the object is dynamically searched using the attributes and traversal rules. This enables acquiring accurate results from the very first object learned and updating data over time thereby allowing accommodation of various use-cases from the deployed environment.

In accordance with the present invention, the system (100) and the method bring stability and consistency in execution against dynamic objects. The system (100) and the method track changes in object attributes, structure and behaviour thereby facilitating identification of dynamic objects automatically and correction of the object locator on the fly during test execution. Thus, making test execution of web applications more reliable despite changes in objects. Further, the newly learnt locators are also added to the object repository (50) for future use thereby ensuring identification of the objects even if the object locator changes frequently.

Advantages of the Invention

1. The system (100) and the method ensure reliable identification of an object despite dynamism.
2. The system (100) and the method allow the tester to focus on the test case development of test cases rather than object management that in turn increases the success rate and efficiency of the automatic testing.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, and to thereby enable others skilled in the art to best utilize the present invention and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the scope of the claims of the present invention.

We claim:

1. A system for an identification of one or more web elements used in an automation test case, the system being implemented on an electronic device of a user, the system comprising:
an object identifier module for identifying the one or more web elements and/or one or more objects of the automation test case, the object identifier module having,
a locator generator for generating a string-based locator,
an object structure generator for generating a hierarchal representation of ancestors of a web element of the one or more web elements,
an object spy having an object repository handler and an execution environment handler, and
a data serializer for converting the web element into a stream of bytes;
an automation engine operably connected to the object identifier module and adapted to use the string-based locator to identify a web element of the one or more web elements on a current page, the automation engine having,
an object locator tester for validating search results using a locator value,
the object repository handler for retrieving a web element data from an object repository,
the execution environment handler being an interface used to interact with an execution environment, and
a correction module for processing the web element data and for correcting the identified web element automatically on fly during test execution and for returning a status and the identified web element to the automation engine, the correction module having,
an object finder for finding a list of matching web elements in a document using the locator value,
an object data comparator for comparing attributes of the identified web element with a saved object web element data of the list of matching web elements on finding a single result, and
a data remodeler for updating the saved web element data after receiving comparison from the object data comparator on finding the web element as a single element based on the single result;
an object repository operably connected to the automation engine for storing data of object locators and for maintaining the web element data; and
a reporting module operably connected to the correction module and adapted to display results of the test execution.

2. The system as claimed in claim 1, wherein the string-based locator is selected from any one of Extensible Markup Language (XML) Path Language and Cascaded Style Sheet Selector.

3. The system as claimed in claim 1, wherein the web element data is a data required to identify a web element of the one or more web elements in a current view of an execution environment.

4. A method for an identification of web elements used in an automation test case, the method comprising:
identifying a web element of the web elements and identification data thereof using an object spy and storing the identification data in an object repository;
retrieving the web element from an execution environment handler;
generating a unique locator by a locator generator to identify the web element in a page;
generating a hierarchical representation of ancestors of the web element by an object structure generator;
combining the unique locator and the hierarchical representation to form a single object;
serializing an object data of the single object by a data serializer;
processing a test step of the automation test case by an automation engine;
retrieving the object data from the object repository by an object repository handler;
processing the object data by a correction module to correct the web element automatically on fly during processing the test step for returning a status of the processing of the object data and returning the web element to the automation engine;
performing an action on the web element returned by the automation engine;
finding a list of matching objects in a document using a locator value by an object locator tester;
comparing attributes of the web element with a saved object data of the list of matching objects in an object data comparator on finding a single result; and
updating the object data by a data remodeler on finding the web element as a single element based on the single result.

5. The method as claimed in claim 4, wherein the identification data consists of a point in time hierarchical representation of the web element and all ancestors thereof along with a tag, attributes, and relative indexes of each of the web element and ancestors thereof.

6. The method as claimed in claim 4, wherein the unique locator is selected from any one of Extensible Markup Language (XML) Path Language and Cascaded Style Sheet Selector.

7. The method as claimed in claim 4, wherein the object data is a data required to identify the web element in a current view of an execution environment.

8. The method as claimed in claim 4, wherein on matching one or more instances of the single object if multiple or no results are found, the object data is tested against in the document by an object finder to find the single element with a highest threshold match.

\* \* \* \* \*